United States Patent [19]
Imaike et al.

[11] Patent Number: 4,704,873
[45] Date of Patent: Nov. 10, 1987

[54] METHOD AND APPARATUS FOR PRODUCING MICROFINE FROZEN PARTICLES

[75] Inventors: Sekiji Imaike, Osaka; Takeki Hata, Kobe; Norio Yamazaki, Itami, all of Japan

[73] Assignee: Taiyo Sanso Co., Ltd., Osaka, Japan

[21] Appl. No.: 927,039

[22] Filed: Nov. 5, 1986

[30] Foreign Application Priority Data

Nov. 14, 1985 [JP] Japan ............................... 60-255496
Jul. 23, 1986 [JP] Japan ............................... 61-173317

[51] Int. Cl.⁴ ............................................. F25D 17/02
[52] U.S. Cl. ............................................. 62/64; 62/68; 62/78; 62/538
[58] Field of Search .................. 62/64, 68, 78, 538

[56] References Cited

U.S. PATENT DOCUMENTS

| | | | |
|---|---|---|---|
| 2,875,588 | 3/1959 | Berger | 62/64 |
| 3,228,838 | 1/1966 | Rinfret et al. | 62/78 |
| 3,411,309 | 11/1968 | Skrebowski et al. | 62/538 |
| 3,513,212 | 5/1970 | Skrebowski et al. | 62/538 |
| 4,178,776 | 12/1979 | Baldus et al. | 62/538 |

*Primary Examiner*—Ronald C. Capossela
*Attorney, Agent, or Firm*—Griffin, Branigan, & Butler

[57] ABSTRACT

A method of producing microfine frozen particles from water, liquid drugs, juices, etc. comprises the steps of atomizing a mixture of a liquid with a gas and directing the mixture toward a body of a refrigerant liquid whose surface is stirred by application of kinetic energy to form ripples. The refrigerant liquid being liquid nitrogen, liquid air, a cooled organic solvent or the like, so that the atomized liquid undergoes heat exchange with the refrigerant liquid to form fine frozen particles. An apparatus for practicing the method, comprises a vessel for containing the refrigerant liquid, apparatus for forming ripples at the surface of the refrigerant liquid by injecting a gas, or by applying vibrations to the vessel or the refrigerant liquid, an atomizer functioning as a mixer and atomizer for a liquid and a gas, and an apparatus for collecting the microfine frozen particles from the refrigerant liquid.

18 Claims, 17 Drawing Figures

METHOD AND APPARATUS FOR PRODUCING MICROFINE FROZEN PARTICLES

FIELD OF THE INVENTION

This invention relates to an improved method of, and apparatus for the production of microfine frozen particles. The invention is useful in such applications as the processing of foods and pharmaceuticals and in the surface treatment of various objects.

PRIOR ART

In industries where fine ice particles for ice blasting are produced for the surface treatment of objects and where quick-frozen granules are produced in the processing of foods, it has been conventional practice to produce them by a method as disclosed in Japanese application No. 56-23882 and Toku Koh Sho No. 49-48832 wherein water or an aqueous liquid is ejected from a sprayer onto the surface of a refrigerant liquid, such as liquid nitrogen, contained in a vessel. However, in this prior art method there exists a problem in that, because the liquid refrigerant is static, the frozen particles of water adhere to one another to form a film on the surface of the refrigerant liquid. This phenomemon is attributed in part to the fact that a frozen particle has a density close to that of the refrigerant liquid and does not readily sink into the refrigerant liquid. Consequently, the frozen mist falling successively from the sprayer piles up on the film of frozen particles and the film begins to sink into the refrigerant liquid surface only when the film has assumed a weight sufficient to force itself downwardly into the refrigerant liquid. For this reason the prior art method fails to provide frozen particles which are separate one from another and as a whole can be easily handled.

In an attempt to prevent the above-described piling of frozen mist it has been proposed that a revolving sprayer be used. Also proposed is a method wherein the surface of the refrigerant liquid is horizontally moved. However, these modifications do not completely eliminate the problems relating to the formation of films of frozen particles and the piling thereon of frozen mist. Furthermore, the prior art attempts to provide a small apparatus capable of producing microfine frozen particles have been unsuccessful in that the particles are not separate one from another so that they can be handled smoothly and efficiently.

According to conventional methods wherein water or an aqueous liquid alone is atomized, the size of the frozen particle is changed by adjusting the nozzle opening of the sprayer and the liquid pressure. This adjustability of the size of the frozen particles, depending on adjustment of the nozzle opening and the liquid pressure, is limited to a very narrow range. Moreover, it is difficult to adjust the particle size in this way and the production of microfine frozen particles having a diameter of less than 50 $\mu$m is impractical.

SUMMARY OF THE INVENTION

An object of the present invention is to provide a method and apparatus for the production of fine ice particles and frozen granules the particles or granules being separate, each from the other and characterized by smoothness when handled.

An object of the invention is to provide a method and apparatus for the production of microfine frozen particles or granules and particularly microfine particles having diameters less than those heretofore attainable and which are smooth and separate each from the other.

A further object of the invention is to provide a method and apparatus for producing microfine frozen particles or granules having diameters limited to a narrow range which is easily adjustable.

Another object of the present invention is, in the production of microfine frozen particles, to reduce the scale of the apparatus employed by introducing a method wherein the formation of ripples of a refrigerant liquid at the surface virtually enlarges the refrigerant surface area required for freezing the particles falling thereon so that the horizontal cross section of the refrigerant vessel can be reduced.

A further object of the present invention is, in the production of microfine frozen particles, to make it possible to efficiently produce such particles with sizes ranging from 30 to 300 $\mu$m by introducing a method whereby the range of desired size of the particles may be varied by a factor of ten to one by adjusting the gas-to-liquid ratio of a fluid mixture.

The above-stated objects of the invention are realized by providing a refrigerant liquid contained in a refrigerant vessel and releasing atomized or fine particles of a fluid (gas-liquid) mixture into the region of the vessel above the refrigerant liquid while kinetic energy is applied to the refrigerant liquid to cause ripples at its surface. The particles of the fluid mixture thus relased, while being scattered, disintegrate into smaller particles because of the gaseous expansion of the gas in each particle released in a gaseous atmosphere. The particles of water or aqueous liquid with reduced dimensions assume a globular shape while falling because of surface tension, and they then freeze to solid particles when they reach the surface of the refrigerant liquid. The particle size of the frozen particles can be varied by adjusting the gas-to-liquid ratio of the atomized fluid mixture as well as the pressure applied to the fluid mixture for the atomization through a nozzle. The ripples of the refrigerant liquid at its surface, caused by the kinetic energy imparted thereto, stir the frozen particles at the surface so that the particles are prevented from adhering to one another to form a film. The formation of ripples in the refrigerant liquid at its surface virtually enlarges the surface of the refrigerant liquid to improve the process and, therefore, makes it possible to reduce the size of the refrigerant vessel.

A device emboying the present invention comprises a vessel containing a refrigerant liquid, a means to induce or create ripples in the refrigerant liquid at its surface, a means ot atomize a gas-liquid mixture into a mist which falls onto the refrigerant liquid, and a means to collect the microfine frozen particles in the refrigerant liquid from the vessel.

Other objects, features, aspects and advantages of the present invention will become apparent upon consideration of the following detailed description of the invention when taken in conjunction with the accompanying drawings.

DESCRIPTION OF A PREFERRED EMBODIMENT

Figure 1:
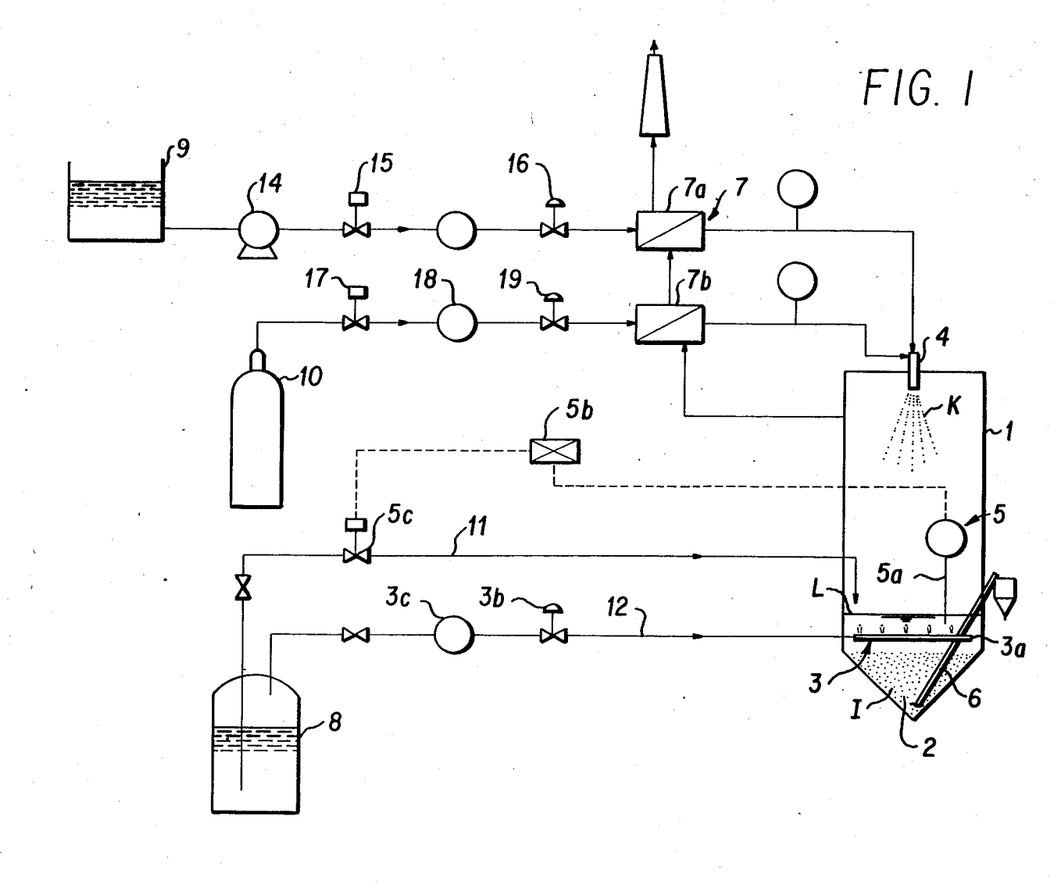
FIG. 1 is a flow diagram illustrating one embodiment of a system for producing microfine frozen particles according to the present invention.

As illustrated in FIG. 1, an apparatus for producing microfine frozen particles in accordance with the principles of the present invention comprises a refrigerant vessel 1 containing a refrigerant liquid 2, a means 3 for inducing ripples in the surface of the refrigerant liquid by applying kinetic energy thereto, an atomizer 4 for mixing a liquid with a gas and disintegrating the mixture into fine particles K which are sprayed into the vessel in the region above the surface of the refrigerant liquid, a first means 5 for controlling the refrigerant level, a second means 6 for collecting microfine frozen particles, a third means 7 for cooling a liquid to be frozen and a gas to be mixed therewith, a refrigerant liquid supply tank 8, a supply tank 9 for feeding the liquid to be frozen, and a gas container 10 for storing and feeding the gas to be mixed with the liquid.

The refrigerant vessel 1 is a square-bodied vessel of stainless steel (SUS 304), having a lower part which is conically tapered toward the bottom. The vessel 1 in the example described herein measures 400 mm by 400 mm horizontally and 1,200 mm vertically, all in external dimensions, and all the exterior sides are insulated with a thermal insulator (not shown) such as a vacuum insulator.

The refrigerant vessel 1 contains the refrigerant liquid 2, which, in the example, is liquid nitrogen supplied from the refrigerant liquid supply tank 8 through a refrigerant liquid supply conduit 11, and the refrigerant level L is maintained at a height of about 500 mm from the bottom. The level L of the refrigerant liquid is always maintained at a set point by means of a conventional refrigerant level control unit 5 comprising a level detector 5a, a level control board 5b and a level control valve 5c.

Not only is liquid nitrogen suitable for use as a refrigerant liquid 2 as in the example herein but also a liquefied gas such as liquid air or liquefied carbon dixoide gas can be used for the purpose. An organic solvent (e.g. hexane) which is insoluble in water and has a low melting point, when cooled by a refrigerator (not shown) to a temperature below 0° C., is also suited to the same purpose.

The means 3 for making ripples, comprises a gas spray tube 3a, a gas flow regulating valve 3b, and a flow meter 3c. The meter 3c receives from supply tank 8 the gaseous nitrogen resulting when the liquid nitrogen in the tank is warmed by the environment and evaporates. The flow of gaseous nitrogen out of spray tube 3a makes ripples in the refrigerant liquid at the surface L by applying kinetic energy thereto.

Figure 2:
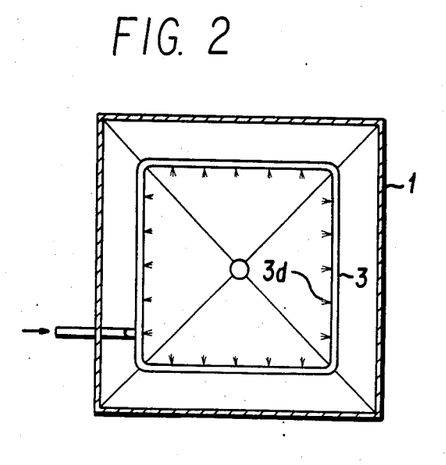
FIG. 2 is a plan view showing a gas spraying tube.
Figure 3:
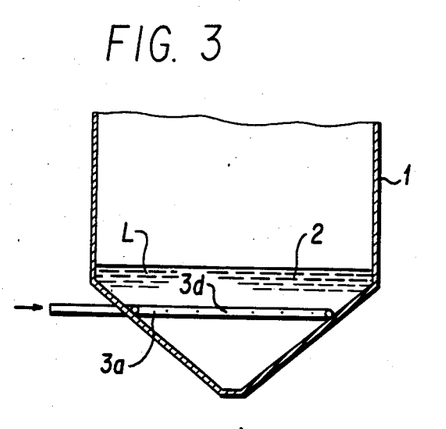
FIG. 3 is a side view of the gas spraying tube shown in FIG. 2.

As shown in FIGS. 2 and 3, the gas spray tube 3a is substantially square-shaped and horizontally positioned 40–150 mm below the level of the refrigerant liquid. The gas spray tube 3a should preferably be placed at a depth within 100 mm of the surface of the refrigerant liquid. If the gas spray tube 3a is placed too deep, the gas sprayed therefrom is cooled so that the effect of bubbles is lessened, as will be understood from later descriptions, and the consumption of both the refrigerant liquid and the sprayed gas (refrigerant gas) is increased.

The gas spraying tube 3a has spraying nozzles 3d (FIG. 2) spaced from each other about 50–100 mm, each nozzle being bored substantially horizontally and inwardly. The refrigerant gas is supplied thereto from a vapor phase in the refrigerant liquid supply tank 8, through a refrigerant gas supply conduit 12 and the gas flow regulating valve 3b, and sprayed or spouted from the nozzles 3d into the refrigerant liquid.

Figure 5:
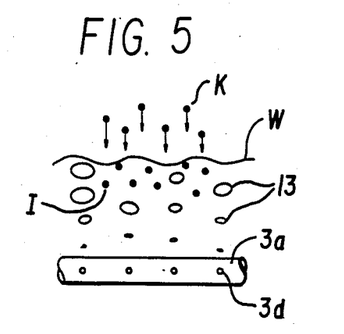
FIG. 5 illustrates gas bubbles in action as sprayed from a gas spraying tube.

The optimal flow rate at which the refrigerant gas is emitted from the gas spray tube 3a is between 200–400 l/m² per minute. As shown in FIG. 5, the refrigerant gas sprayed therefrom forms flows of bubbles 13 rising toward the surface of the refrigerant liquid, and as they rise close to the surface, the bubbles burst. The kinetic energy that is generated by these flows of bubbles and thus applied to the refrigerant liquid at the surface L causes the refrigerant liquid to form ripples W with a wave height ranging between 5 and 20 mm at the surface L, and frozen particles I which have fallen onto and into the refrigerant liquid 2, one particle in contact with another, are stirred by the ripples so that they are prevented from adhering to one another.

The density of the refrigerant liquid 2 at the surface is lowered by the presence of such bubbles, the difference in density thereby being widened between the frozen particles and the refrigerant liquid, and, as a result, the frozen particles sink easily into the refrigerant liquid. The optimal wave height of the ripples is within the range of 5 to 10 mm. If the wave height exceeds 20 mm, the stirring action at the surface of the refrigerant liquid becomes an obstacle to the sinking frozen particles.

While in the example described herein the ripplemaking means 3 has the gas spraying tube 3a supplied with a refrigerant gas from the vapor phase in the refrigerant liquid supply tank 8, it is equally practical to provide a separate refrigerant gas supply tank. Instead of the refrigerant gas referred to herein, any gas other than those having low condensation points or containing $CO_2$ may be used.

The ripple-making means 3 may take forms other than that illustrated in FIG. 1. For example, a liquid spray tube with spray nozzles bored therein can be placed in the refrigerant liquid with the refrigerant liquid supplied thereto from the refrigerant liquid supply tank 8. Instead of the refrigerant liquid supply conduit 11 shown in FIG. 1, this alternative requires a refrigerant liquid return pipe as part of the means to maintain the level of the refrigerant liquid at a set point.

Figure 4A:
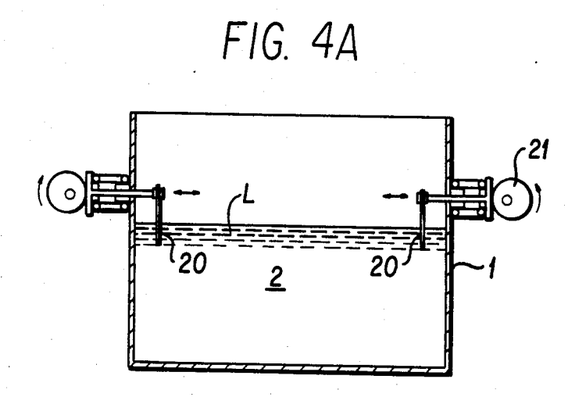
FIGS. 4A, 4B, 4C, and 4D illustrate first, second, third, and fourth embodiments of a device for inducing ripples on the surface of a liquid refrigerant contained in a vessel.
Figure 4B:
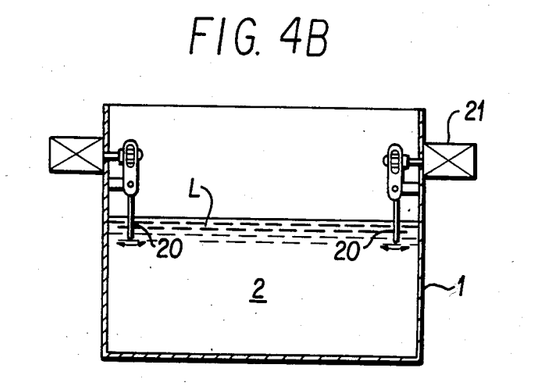

FIGS. 4A and 4B illustrates a vibrator-type ripple-making means including vibrators 20 extending into the refrigerant liquid 2 and driven by motors 21 or the like mounted on the outside of vessel 1. The vibrators 20 may be driven in a regular reciprocal motion (FIG. 4A), swinging motion (FIG. 4B), or rotational motion. By activating the vibrators by means of motors 21 the refrigerant liquid 2 can be given mechanical vibrational energy so that the refrigerant liquid forms ripples at the surface L.

Figure 4C:
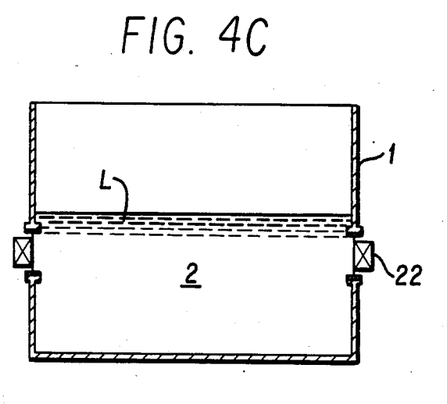

As shown in FIG. 4C, sonic oscillators or transducers 22 designed to oscillate at a desired frequency can be mounted on the refrigerant vessle 1 either at the inside or at the outside. By activating the oscillators 22 the refrigerant liquid 2 is given sonic energy so that the refrigerant liquid forms ripples at the surface L.

Figure 4D:
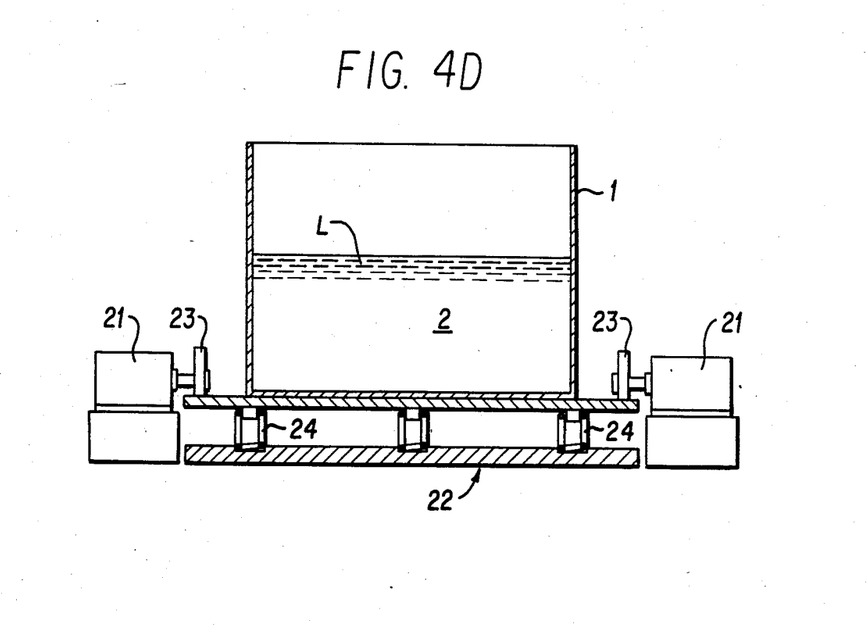

The ripple-making means may take the form of a mechanial shaker for the vessel 1. As illustrated in FIG. 4D, the refrigerant vessel 1 may be mounted on a shaking stand 22 or the like with a mechanism, including cams 23 and springs 24 for giving the refrigerant vessel 1 a mechanical shaking motion. By activating one or more motors 21 this mechanism shakes vessel 1 and the refrigerant liquid therein so that the refrigerant liquid forms ripples at the surface L.

In a further embodiment (not shown) a jet blow tube may be placed over the refrigerant liquid 2 as a means for blowing onto the surface L of the refrigerant liquid. A refrigerant liquid jet or a gas jet may be used. For a gaseous jet, a refrigerant gas or gas with a relatively high condensation point, e.g. air devoid of $CO_2$, may be used. By flowing such jets onto the surface of the refrigerant liquid 2 the refrigerant liquid is given kinetic energy so that the refrigerant liquid forms ripples at the surface L.

Figure 6:
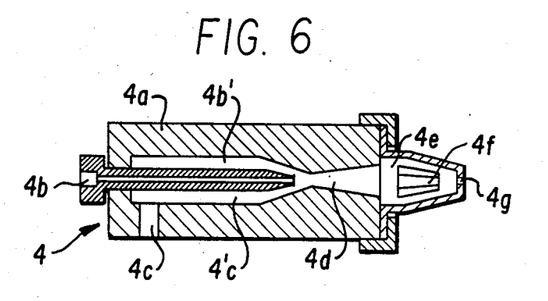
FIG. 6 is a cross-section view of an atomizer.

In FIG. 1, the atomizer 4 is designed to mix the liquid to be frozen with a gas and then atomize the liquid into fine particles. A suitable atomizer as illustrated in FIG. 6 comprises a liquid inlet 4b and a gas inlet 4c at the back of an atomizer body 4a and passages 4b' and 4c' extending from the liquid and gas inlets, respectively, to a throat 4d where the two passages meet so that the liquid and gas are mixed. The throat 4d opens to a mixing chamber 4e with a set of guide vanes 4f therein so that a liquid-gas mixture formed at the throat 4d is led into the mixing chamber where said mixture is stirred and homogenized by means of the guide vanes 4f and then ejected out of the atomizer through a nozzle 4g. It is obvious that other atomizers differing in structure or shape from that shown in FIG. 6 may be used so long as they have a mixing mechanism for a liquid and a gas and a mechanism to disintegrate the mixture into fine particles at ejection.

The liquid to be frozen, that is to say, water, fruit juices, drugs, etc., is fed from the liquid supply tank 9 (FIG. 1) through a pump 14, a pressure-reducing valve 15, a control valve 16, and the cooling means 7 and enters to the atomizer 4 through the liquid inlet 4b. The pressure under which the liquid is thus fed is 1.0–2.0 kg/cm² G in the example described herein.

The gas to be mixed with the liquid should be of a type that shows a relatively poor solubility in the liquid. The gas is fed from the gas feeding storage 10, through a pressure-reducing valve 17, a flow meter 18, a control valve 19 and the cooling means 7, and into said atomizer 4 through the gas inlet 4c. The pressure under which the gas is thus fed is 1.0–2.0 kg/cm² G in the example described herein. It will be recognized that in an alternative embodiment the atomizer 4 can be fed with the gas from the vapor phase in the refrigerant liquid supply tank 8.

Where water is used as the liquid to be frozen and nitrogen gas is used as the refrigerant gas as the gas to be ejected therewith, each may be fed to the atomizer at a pressure of 1.0 kg/cm² G.

The optimal mixing ratio of the liquid and the gas, both to be atomized together, is:

$$.5 \leq \frac{\text{liquid l/h}}{\text{gas Nl/min.}} \leq 1.5$$

By changing this mixing ratio the particle size of the frozen particles can be varied in the range from one to one-tenth without changing the feeding pressure applied to the liquid and the gas. Although it is advantageous in practice to make the diameter of the nozzle 4g as small as possible insofar as the effect is considered, consideration of difficulty in drilling and liability to clogging makes it advisable to employ an atomizer with a nozzle whose diameter is between 0.3 and 1.0 mm.

The liquid and the gas mixed in the throat 4d and in the mixing chamber 4e in the atomizer 4 are evenly mixed by the guide vanes 4f and the resultant homogeneous mixture is atomized through the nozzle 4g onto the surface L of the refrigerant liquid. When this mixture is passed through the nozzle 4g, the gas mixed therein being present both within the particles of the atomized mixture as well as between each particle, the expansion of the gas contained in the particles makes the particles disintegrate into smaller particles while being blown in jets and, moreover, the gas bubbles present between each particle impart to the particles a scattering force that brings the particles into collision against one another so that the particles disintegrate into still smaller particles.

Each of the liquid particles K ejected from the atomizer 4 assumes a globular form under surface tension while falling in the refrigerant vessle 1 toward the refrigerant liquid. The drop between the atomizer 4 and the surface L of the refrigerant liquid, as well as the temperature of the atmosphere inside the refrigerant vessel are factors greatly influencing the particle size of the fine frozen particles and their shape. According to experiments, it is advisable to make the drop somewhere between 500 and 1500 mm and to make the temperature of the atmosphere inside the refrigerant vessel somewhere below −20° C. As previously stated, the refrigerant level-controlling means, indicated generally by the numeral 5, functions to maintain an appropriate drop between the atomizer 4 and the surface L of the refrigerant liquid in the vessel. Since the level of the refrigerant liquid constantly changes with the ripples, the liquid level is controlled by maintaining the ridges of the ripples within a set range.

The cooling means 7 lowers the temperature of the liquid to be frozen and the temperature of the mixing gas, both introduced into the refrigerant vessel through the atomizer 4, and is so designed as to economize the consumption of the refrigerant liquid. Cooling means 7, comprises a cooler 7a for cooling liquid and a cooler 7b for cooling gas. The cooling means is designed to draw refrigerant gas from the refrigerant vessel 1 for the cooling function.

In the example described above, the liquid and the gas are separately cooled and then mixed and atomized by an atomizer 4. However, in an alternative embodiment the mixing step may be separated from the atomization so that the liquid and the gas are mixed first, the mixture cooled, and the cooled mixture then atomized.

Figure 7:
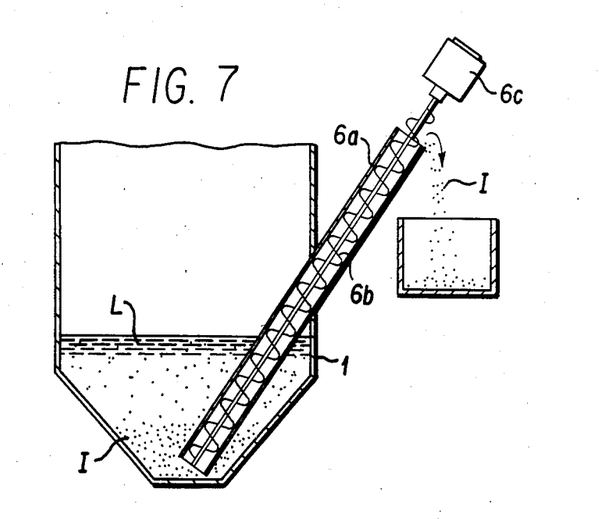
FIG. 7 illustrates one embodiment of an apparatus for collecting microfine frozen particles.

The microfine liquid particles K, falling from the atomizer 4 toward the refrigerant liquid, freeze into hard particles as they reach the surface of the refrigerant liquid. The ripples at the surface thereof prevent these particles from adhering to one another to form films so that these particles sink separately into the refrigerant liquid. The particles which have thus sunk to the bottom of the refrigerant vessel 1 are then carried out and away from the refrigerant liquid 2 by a carrying means 6. The carrying means may take any one of several forms. For example, the carrying means 6, as shown in FIG. 7, may comprise essentially a guide pipe or tube 6a extending through a side wall of the vessel 1. An auger or screw rotor 6b is rotatably held within the guide pipe, and driven by a drive motor 6c. This carrying means continuously carries the frozen particles I out and away from the bottom of the refrigerant vessel 1 to a suitable collection receptacle 39.

An experiment was conducted to determine the operability of a system as described above. The refrigerant vessel 1 consisted of a square-bodied vessel measuring 400 mm by 400 mm horizontally and 900 mm vertically and whose four sides were downwardly extended to an additional height of 300 mm in a shape conically tapering toward the bottom. The vessel contained liquid nitrogen as the refrigerant liquid 2 to a height of 500 mm from the bottom so that the distance from the ceiling of the vessel to the surface L of the refrigerant liquid was 700 mm.

Inside the vessel, a gas spray tube peripherally and horizontally extended in a form of a square 350 mm by 350 mm was placed at a position 50 mm below the surface of the refrigerant liquid, and supplied with nitrogen gas from the vapor phase in the liquid nitrogen supply tank at the flow rate of 300 l m² per minute so that by spraying the gas from the tube inwardly through nozzles the liquid nitrogen was made to form ripples at the surface whose wave height was 8 mm on the average.

The fluid to be atomized consisted of water as the liquid to be frozen and nitrogen gas (25° C.) supplied from a high pressure storage vessel was used as the gas to be mixed therewith. These two components were mixed under a pressure of 1.2 kg/cm² G and by regulating the flow rate of the nitrogen gas at 4.5 Nl/min. the mixture was atomized through a nozzle 0.5 mm in diameter toward the refrigerant liquid below. The atomizer was placed about 700 mm above the surface L of the liquid nitrogen and the atomization rate was 6 l/h. The maximum temperature of the atmosphere in the refrigerant vessel was −20° C.

The refrigerant vessel was supplied with liquid nitrogen at a flow rate of 20 l/h for replenishment in order to maintain the surface of the liquid nitrogen at a set level.

The cooling means 7 was supplied with vaporized nitrogen gas, that is to say the gas discharged from the refrigerant vessel, and introduced for the cooling at a rate of 20×0.65 Nm³/h.

Figure 9:
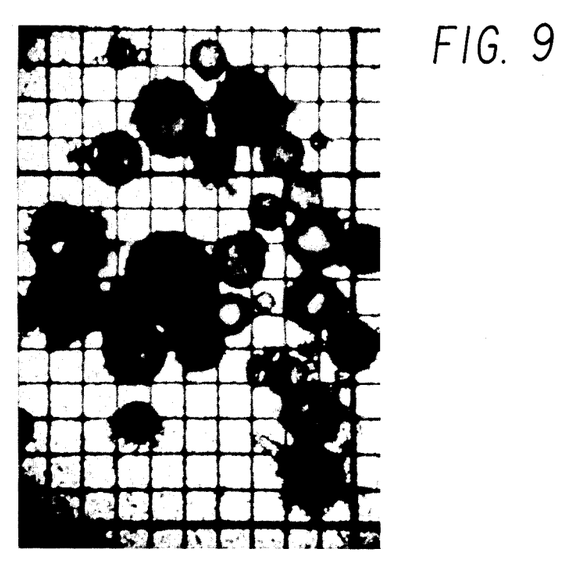
FIG. 9 shows a magnified (150 X) photographic representation of microfine frozen particles obtained according to the present invention.
Figure 10:
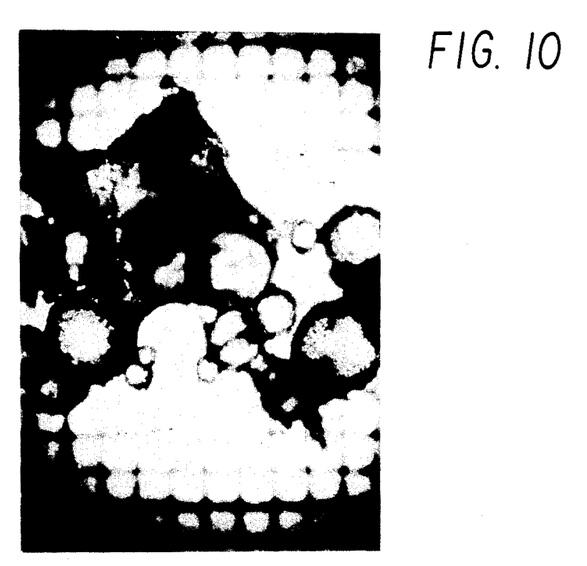
FIG. 10 shows a magnified (150 X) photographic representation of fine frozen particles which were obtained when ripples were not formed and the liquid for freezing was used without mixing with a gas.

Under the conditions set as described above the mixed water and nitrogen gas, continuously atomized for about 10 minutes, yielded about one liter of microfine frozen particles (ice particles) with particle sizes averaging between 70-80 μm. Each of these particles was distincly separated from another, as shown by FIG. 9 illustrating some of them in a magnified (150 X) microscopic photograph. On the other hand, particles were obtained in the form of scales or films when no gas had been mixed with the liquid in atomizing and no ripples of the refrigerant liquid had been formed at the surface. This is shown by FIG. 10 which illustrates the results in a magnified (150 X) microscopic photograph. Thus, a marked difference existed between the frozen particles obtained according to the present invention and those obtainable by conventional methods.

Figure 8:
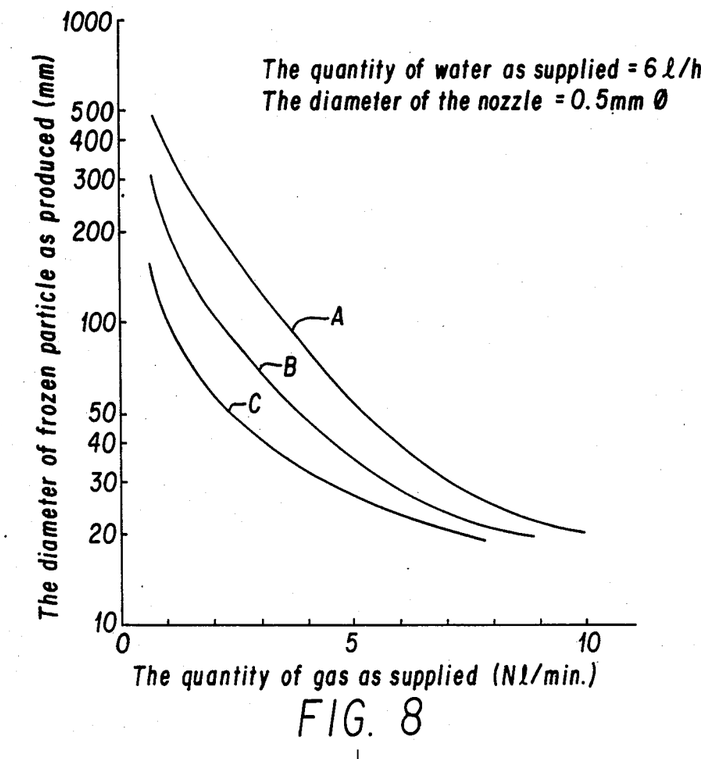
FIG. 8 shows curves representing the correlativity between the particle size of microfine frozen water particles and the flow rate of a gas (nitrogen gas) mixed with the unfrozen water.

FIG. 8 shows dimensional changes of the microfine frozen particles as a function of the discharge pressure under which the mixed fluid is atomized and also of the flow rate of nitrogen gas fed into the atomizer for mixing with the liquid. In the diagram, the curve A represents changes under a discharge pressure of 1 kg/cm² G, the curve B represents changes under a discharge pressure of 1.5 kg/cm² G, and the curve C represents changes under a discharge pressure of 2 kg/cm² G. Water alone, atomized without mixing a gas therwith, yielded particles with sizes about 400 μm under a discharge pressure of 1 kg/cm² G, about 320 μm under a discharge pressure of 1.5 kg/cm² G, and about 280 μm under a discharge pressure of 2 kg,/cm² G, the particle size representing an average for each different discharge pressure.

As previously stated, the carrying means 6 (FIG. 1) may take many forms. It may comprise a belt conveyor or a device of any other mechanical type suitable for the purpose. For example, it is possible to employ a device based on the principle of the air lift pump, as illustrated at 25 in FIGS. 11, 12A, and 12B.

Figure 11:
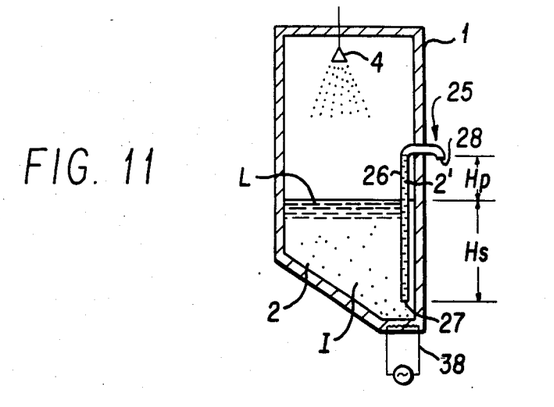
FIG. 11 schematically illustrates a second embodiment of an apparatus for collecting microfine frozen particles.
Figure 12A:
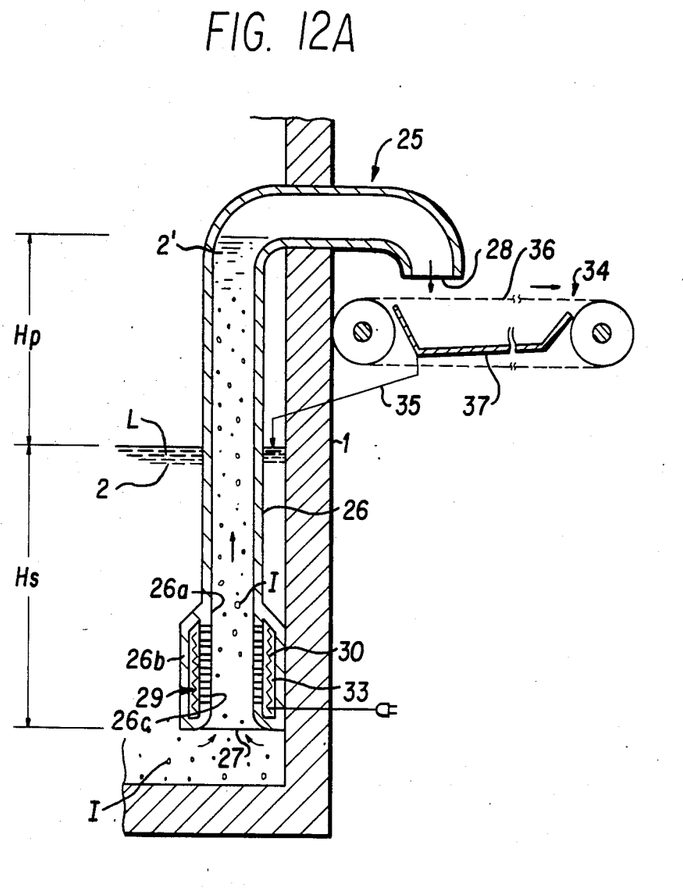
FIG. 12A is a partial sectional view specifcally illustrating one embodiment of an apparatus for generating bubbles as a part of the apparatus shown in FIG. 11 for collecting microfine frozen particles.
Figure 12B:
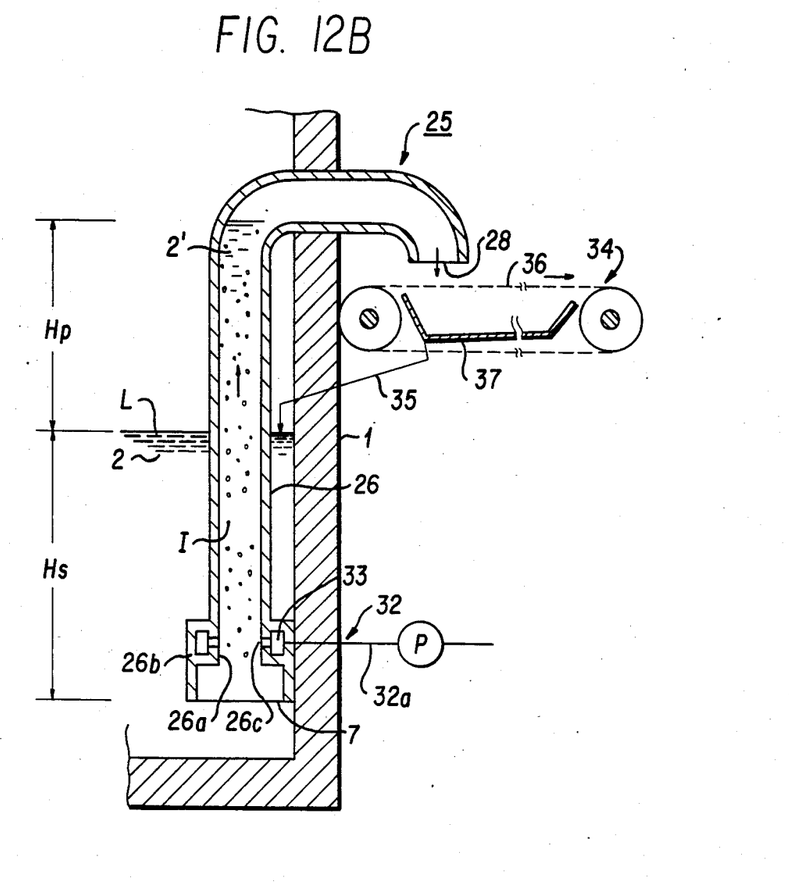
FIG. 12B shows an alternative form of an apparatus for generating bubbles.

The air lift pump may comprise a pipe 26 (e.g. 10⁴ SUS pipe) for drawing frozen particles upward and away from the bottom of the vessel 1. The pipe is placed vertically with the lower portion submerged in the refrigerant liquid and having a suitable diameter. A bubble-generating device, 29 in FIG. 12A and 32 in FIG. 12B, is provided for generating bubbles in that portion 2' of the refrigerant liquid which is within the pipe 26. A means 34 is provided for separating frozen particles from the refrigerant liquid, and a return pipe 35 is provided for returning the separated refrigerant liquid to the vessel 1. The lower part of the refrigerant vessel 1 is tapered or rounded to a narrow bottom (see FIG. 11) and the lower end of pipe 26 is positioned close thereto. A stirring heater 38 is attached to the bottom of vessel 1. The pipe 26 has its inlet 27 positioned at a distance Hs below the level L of the refrigerant liquid and its outlet 28 at a distance Hp above level L. Two 90° bends are provided in the pipe so that the outlet 28 is open downwardly. The lower end portion of pipe 26 consists of double tubes, the internal tube 26a being the same diameter as the main portion of the pipe and the external tube 26b enclosing the internal tube 26a with a space therebetween. A plurality of small holes 26c extend through the internal tube 26a.

The bubble-generating means 29 is a heater for applying thermal energy to the refrigerant liquid 2' within the pipe 26 while the bubble-generating means 32 is an injector for injecting a gas into the refrigerant liquid 2'.

As shown in FIG. 12A, the bubble-generating heater 29 comprises a heater 30, such as an electric heater coil, which is placed in the circular space 33 beween the internal tube 26a and the external tube 26b. When the refrigerant liquid 2' in the pipe 26 is heated it forms bubbles by vaporization, causing its apparent specific gravity to decrease, and, as a result of a difference in specific gravity between the refrigerant liquid 2' and 2 inside and outside of pipe 26 respectively, there is formed a rising current containing bubbles in the refrigerant liquid 2' in the pipe.

As shown in FIG. 12B, the bubble-generating gas injector 32 may comprise a gas-feeding pipe 32a which is led into the circular space 33 at the lower end of the pipe 26 and designed to send a suitable gas, such as nitrogen gas, into the refrigerant liquid 2' inside the pipe through one or more small holes 26c. The refrigerant liquid 2 forms a rising current containing bubbles, as in the case of heating, above, when a gas is applied.

The positioning of the frozen particle-removing means 25, with respect to all its constituent parts including the collecting pipe 26, is so arranged that, when the bubble-generating means 29 or 32 is working, the liquid head pressure between the position of the bubble-generating means and the liquid level L in the refrigerant vessel 1 is large relative to the liquid head pressure between the positon of the bubble-generating means and that of the outlet 28 at the upper end of the collecting pipe 26.

The bubbles generated in the refrigerant liquid 2' inside the frozen particle collecting pipe 26, when the heater 29 or the gas feeder 32 is working, rise together with the liquid adjacent to them, thus forming a rising current inside the collecting pipe 26. As a result, the apparent specific gravity $\gamma'$ of the refrigerant liquid 2' inside pipe 26 is lowered from the specific gravity $\gamma$ of the refrigerant liquid 2 in the vessel 1 in proportion to the volume of the bubbles generated, and there arises a distinct difference in liquid level between the refrigerant liquid 2 outside the pipe and that inside the pipe, the liquid 2' inside assuming a higher level than the liquid 2 outside.

Where the specific gravity of the refrigerant liquid 2 in the vessel 1 is $\gamma$, the apparent specific gravity of the refrigerant liquid 2' inside the collecting pipe 26 is $\gamma'$, the distance between the level of the refrigerant liquid 2' inside the collecting pie 26 and that L of the refrigerant liquid 2 in the vessel 1, that is to say, the height over which the frozen particles are drawn up above the liquid level L is Hp, and the distance between the lower end (inlet) 27 of the collecting pipe 26 and the liquid level L in the vessel 1 is Hs, the following equation exists as the pressure equilibrium at the lower end (inlet) 27 of the collecting pipe 26:

$$\gamma \times Hs = \gamma' X (HS + Hp)$$

or, $$Hp = Hs \, X \, (\gamma - \gamma')/\gamma'$$

From this equation it is seen that Hp can be increased by increasing Hs.

The apparent specific gravity of the refrigerant liquid 2' inside the collecting pipe 26 can be obtained by the equation $\gamma' = \gamma X \, Vw/ (Vw + Vg)$ where Vw represents the quantity of the refrigerant liquid 2' in the collecting pipe 26, and Vg represents the volume of the bubbles generated therein, e.g., the gas injected therein.

A frozen particle-collecting means 25 positioned according to the above description permits the refrigerant liquid 2' inside the collecting pipe 26 to be discharged through the outlet 28. Under this condition, when the production of frozen particles I is started, the frozen particles are drawn into the collecting pipe 26, assume the form of slurry together with the refrigerant liquid 2', and are discharged through the outlet 28.

Figure 13:
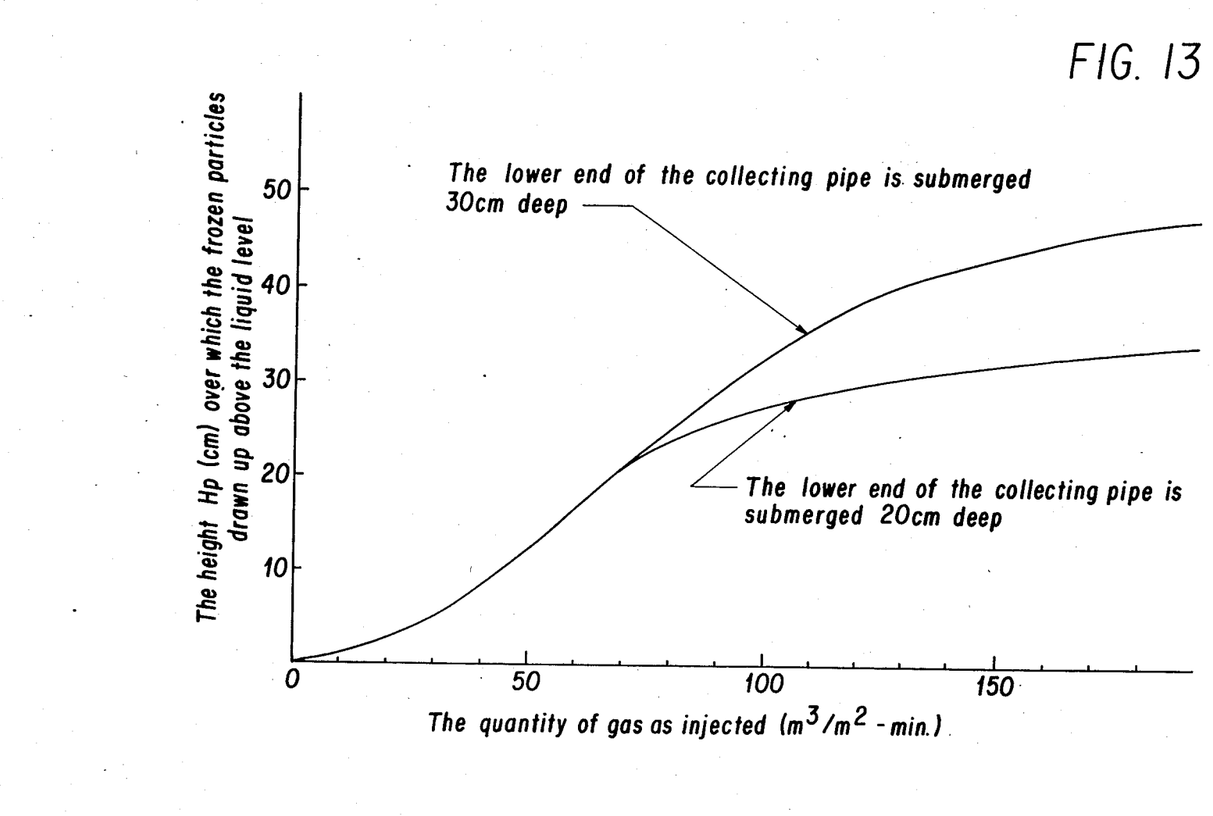
FIG. 13 is a diagram shown the depth of submersion of an apparatus for collecting microfine frozen particles as a function of the distance over which the microfine frozen particles are drawn upwardly for collection and the quantity of the gas injected.

As has been described, the difference in liquid levels between the refrigerant liquid 2' inside the collecting pipe 26 and the liquid 2 in the vessel 1 increases as the length Hs of the collecting pipe 26 below the liquid level is increased. On the other hand, the apparent specific gravity of the liquid in the collection pipe 26 varies with the quantity of the refrigerant gas generated by the heater 29 or the gas injected from the gas feeder 32. FIG. 13 shows an example of the correlation that exists among Hp, Hs and the quantity of the gas injected during the production of ice particles with sizes less than 500 μm by heat exchanging with liquid nitrogen.

Needless to say, it is advisable to formulate the quantities of the refrigerant gas to be generated or those of the gas to be injected in relation to the sizes of the frozen particles I, differences in specific gravity beween the frozen particles I and the refrigerant liquid 2', and the like. For example, for the production of ice particles with sizes less than 500 μm by heat exchanging with liquid nitrogen, it is recommended to set the quantities of the refrigerant gas to be generated or those of the gas to be injected at over 85 Nm$^3$/min. per unit of the cross sectional area of the collecting pipe 26. In this case the ice particles can be collected satisfactorily unless they are contained in the refrigerant liquid 2 in the vessel 1 in the quantities exceeding 50% by weight.

As shown in FIGS. 12A and 12B, the means 34 for separating frozen particles from the refrigerant liquid comprises a mesh conveyor 36, one end of which is under the outlet 28 consituting the upper end of the collecting pipe 26, and a tray 37 placed under and extending in the direction of movement of conveyor 36 for receiving the refrigerant liquid. A return pipe 35 connects the tray 37 to the refrigerant vessel 1 to return the refrigerant liquid to the vessel. The frozen particles-separating means is so designed that the refrigerant liquid 2' and a slurry of frozen particles I and refrigerant liquid 2' discharged from the outlet 28 are loaded onto the mesh conveyor 36 and hence the frozen particles are carried away thereby while the refrigerant liquid 2' loaded thereon is separated from the frozen particles I, passing through the mesh conveyor 36 into tray 37, and from there into the refrigerant vessel 1 through the return pipe 35.

Frozen particles-collecting means 25 embodying the present invention proved efficient in tests as follows.

A frozen particles-collection pipe 26 was placed in a refrigerant vessel 1 at a position where Hs was 300 mm and Hp was 350 mm. The output of the stirring heater 38 was 80 W and that of the lifting heater 30 was 500 W. Water mixed with nitrogen gas was atomized by an atomizer 4 under a pressure of 2.5 kg/cm$^2$ G (water flow 0.2 l/min., nitrogen gas flow 1 l/min.) and, as a result, ice particles I with sizes of 200–300 μm were produced. The ice particles were collected at the rate of 150 g/min with satisfactory results.

In the above test, the quantity of the required refrigerant gas to be generated, or the output of the lifting heater 30, was calculated as follows.

For Hp of 350 mm, the lifting gas required is determined to be about 105 m³/min. m² in the graphic diagram shown as FIG. 13. A collecting pipe 26 has a cross-sectional area, of about $4.1 \times 10^{-4}$ m² (20⁴ SUS pipe). Accordingly, the lifting gas required in the collecting pipe 26, converted in terms of the temperature of liquid nitrogen, is:

$$105 \text{ (m}^3/\text{m}^2 \text{ min.)} \times 4.1 \times 10^{-4} \text{ (m}^2 \times \frac{273 - 196}{273} =$$

$$0.0212 \text{ (m}^3/\text{min.)} = 7.2 \text{ (m}^3/\text{h)}$$

The heat required for vaporizing the liquid nitrogen is $$H = 7.2(\text{m}^3/\text{h}) \times 1.25 \text{ (kg N}_2/\text{m}^3) \times 47.2 \text{ (Kcal/kg N}_2)$$

$$= 424.8 \text{ (Kcal/h)}.$$

Accordingly, the output of the lifting heater 30 is: 424.8 divided by 860 (Kcal/KWH) or about 500 W.

The frozen particles-collecting means employing the air lift pump principle, have no parts sliding in the refrigerant liquid and therefore involve no problems technically or concerning maintenance, so that in the practice they provide advantages in that the structure is simple and yet frozen particles are collected smoothly and satisfactorily.

Obvious changes may be made in the specific embodiment of the invention described herein, such modifications being within the spirit and scope of the invention claimed, and it is indicated that all the details contained herein is intended to be illustrative and not limiting in scope.

What is claimed is:

1. A method of producing microfine frozen particles, comprising:
   atomizing a mixture of a liquid and a gas and directing it toward a refrigerant liquid contained in a vessel so that paticles of the mixture may disintegrate into smaller particles because of the gaseous expansion of the gas in each particle and between the particles, and fall onto the surface of the refrigerant liquid
   substantially freezing the smaller particles in contact with the surface of the refrigerant liquid;
   making ripples on the surface of the refrigerant liquid by imparting kinetic energy thereto so that the frozen particles sink efficiency from the surface of the refrigerant liquid and, further, are prevented from adhering to one another to form a film; and,
   collecting the frozen particles out of the refrigerant liquid in the vessel for disposal outside the vessel.

2. A method as claimed in claim 1 wherein the kinetic energy is imparted to said refrigerant liquid by spraying a gas or a liquid into said refrigerant liquid.

3. A method as claimed in claim 1 wherein the kinetic energy is imparted to said refrigerant liquid by vibrating said vessel.

4. A method as claimed in claim 1 wherein the kinetic energy is imparted to said refrigerant liquid by activating a vibrator means in said refrigerant liquid.

5. A method as claimed in claim 1 wherein the kinetic energy is imparted to said refrigerant liquid by spraying a gas or a liquid onto the surface of said refrigerant liquid.

6. A method as claimed in claim 1 wherein the kinetic energy is imparted to said refrigerant liquid by applying sonic vibrations thereto.

7. A method claimed in claim 1 wherein said refrigerant liquid present within a depth of 10 cm of its surface is stirred by the kinetic energy imparted thereto.

8. A method claimed in claim 1 wherein the ripples formed by said refrigerant liquid at its surface have wave heights of 5 mm to 10 mm.

9. A method as claimed in claim 1 wherein the temperature of the atmosphere inside said refrigerant vessel is maintained below $-20°$ C.

10. In an apparatus for producing fine frozen particles and including a vessel for containing a refrigerant liquid, the improvment comprising:
    a means for making ripples at the surface of a refrigerant liquid contained in said vessel;
    an atomizer for atomizing a mixture of a liquid and a gas toward said refrigerant liquid,
    means for collecting frozen particles out of a refrigerant liquid in said vessel for disposal outside said vessel;
    said means for collecting frozen particles comprising:
        a frozen particles-collecting pipe whose lower end opens as an inlet in a refrigerant liquid in said vessel and whose upper end opens as an outlet above the liquid level in the refrigerant vessel and outside said vessel, said frozen particles-collecting pipe having at its lower end a bubble-generating device for causing the refrigerant liquid to form with bubbles a rising current inside the frozen particles-collecting pipe;
        means positioned close to said outlet for separating the frozen particles from the refrigerant liquid, both being discharged from said outlet; and,
        a return pipe for recirculation the refrigerant liquid thus separated from the discharged frozen particles into said refrigerant vessel,
        the positioning of theses collecting devices being so arranged that, when the bubble-generating device is working the liquid head pressure between the position of the bubble-generating device and the liquid level in said refrigerant vessel is large relative to the liquid head pressure between the position of the bubble-generating device and the level of the outlet of the frozen particles-collecting pipe.

11. The improvement as claimed in claim 10 wherein said means for making ripples is a gas spouting tube designed to spout a gas, such as air or nitrogen gas, into a refrigerant liquid in said vessel.

12. The improvement as claimed in claim 10 wherein said means for making ripples is an oscillator means for vibrating said vessel.

13. The improvement as claimed in claim 10 wherein said means for making ripples comprises vibrator means contacting a refrigerant liquid in said vessel.

14. The improvement as claimed in claim 10 wherein said means for making ripples is a gas spouting tube designed to spout a gas onto the surface of a refrigerant liquid.

15. The improvement as claimed in claim 10 wherein said atomizer comprises a device for mixing a liquid with a gas and a nozzle connected thereto for atomization.

16. The improvement as claimed in claim 10 and further comprising means for controlling the level of the refrigerant liquid in said level.

17. The improvement as claimed in claim 10 wherein said bubble-generating device is a heater for providing heat energy to the refrigerant liquid in the frozen particles-collecting pipe.

18. The improvement as claimed in claim 10 wherein said bubble-generating device comprises means for injecting a gas into the refrigerant liquid in the frozen particles-collecting pipe.

* * * * *